Oct. 20, 1931.  G. SPATTA  1,828,158
METHOD OF MAKING WHEELS
Original Filed May 28, 1928
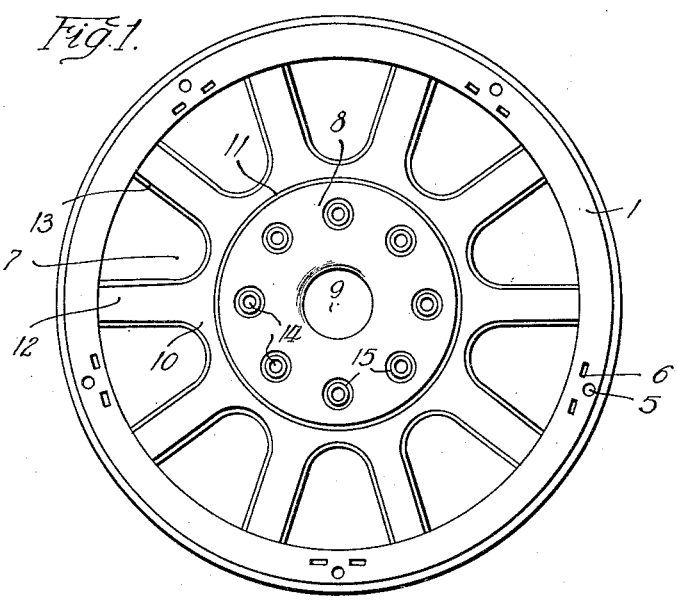
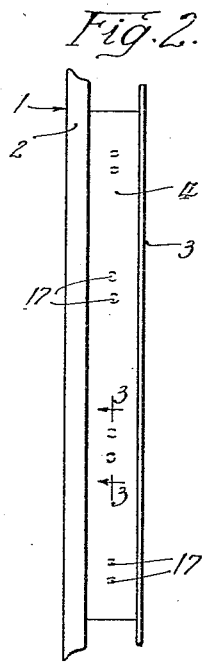
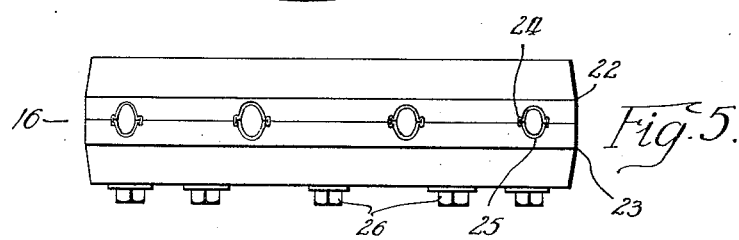
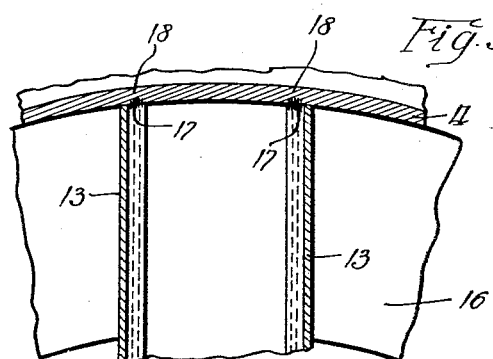
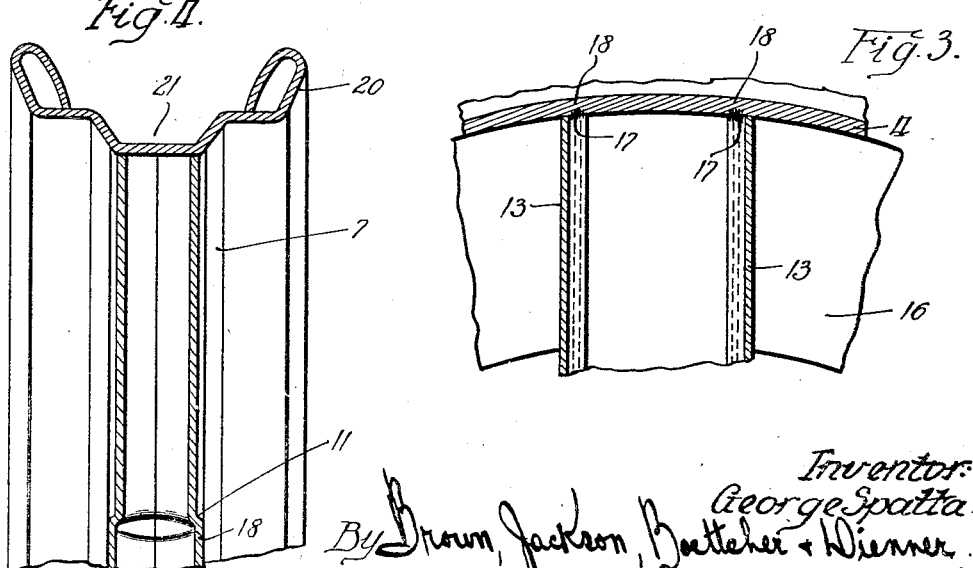
Inventor:
George Spatta.
By Brown, Jackson, Boettcher + Dienner
Attys.

Patented Oct. 20, 1931

1,828,158

UNITED STATES PATENT OFFICE

GEORGE SPATTA, OF BUCHANAN, MICHIGAN, ASSIGNOR TO CLARK EQUIPMENT COMPANY, OF BUCHANAN, MICHIGAN, A CORPORATION OF MICHIGAN

METHOD OF MAKING WHEELS

Original application filed May 28, 1928, Serial No. 280,980. Divided and this application filed April 15, 1929. Serial No. 355,071.

My present invention relates to the method of manufacturing a sheet metal wheel of the type disclosed in my copending application, Serial No. 246,926 filed January 16, 1928, and this application is a division of my copending application, Serial No. 280,980 filed May 28, 1928.

In the manufacture of metal wheels of the spoked variety it is desirable to secure a maximum of strength with minimum weight, and to this end I make the spider of the wheel of sheet metal stampings suitably joined in the preferred form by a lock seam construction, and thereafter force the spider laterally into the rim so as to put the spider under pressure and the rim under tension.

Where the spider is made of sheet metal of the order of fifty-thousandths of an inch thickness, it is desirable to employ the spider in both tension and compression, since sheet metal is able to sustain a load in tension much better than it is in compression, even though formed into tubular spokes, and in order to unite the spider and rim some form of connection should be employed which will permit the upper half of the wheel to act in tension while the lower part is in compression due to a load applied at the hub.

According to the present invention I force the spider into the rim under pressure or shrink the rim onto the ends of the spokes of the spider and then spot-weld the ends of the lock seams to the web of the rim, thereby securing the rim and spider against lateral displacement, locking the end of the lock seam to give it the desirable hoop strength and forming a joint between the spoke and the rim which can sustain a large part of the load in tension.

Now in order to acquaint those skilled in the art with the manner of constructing and operating a device according to my invention, I shall describe in connection with the accompanying drawings the process of manufacturing a sheet metal wheel and the wheel resulting from the same.

In the drawings

Fig. 1 is a side elevational view of a wheel embodying my invention.

Fig. 2 is an edge view of the wheel taken from the top of Fig. 1.

Fig. 3 is a fragmentary section through the end of a spoke and the adjacent part of the web of the rim.

Fig. 4 is a fragmentary cross section through the end of the spoke and a drop center rim; and Fig. 5 is an edge view of the supporting rim or clamp by which the spoke ends are supported for forcing the spider into the rim.

The wheel shown in Fig. 1 comprises an endless circular rolled rim 1 of outwardly facing channel section comprising the flanges 2 and 3 and connecting web 4. This form of rim may be bought on the open market with the holes 5 punched for the reception of bolts for holding the clamping lugs which are received in the openings 6 also punched in the rim.

The spider 7 is made up of two complementary sheet metal stampings drawn from sheets of metal of a thickness of the order of fifty-thousandths of an inch. These complementary stampings comprise a disk shaped hub portion 8 of circular outline having a central opening 9 defined by inwardly extending flanges meeting in the median plane of the wheel transverse to the axis. The hub disk 8 is joined to the web portion 10 through a shoulder 11, the dimensions of which shoulder may be varied for controlling the thickness of the hub of the wheel. Spokes 12, 12 are formed integral with the web 10, and this web is in turn integral with the hub disk 8. The spokes 12, 12 are substantially cylindrical. The margins of the two stampings on the sides of the spokes and web portion 10 between spokes are united by lock seams employing the channel strips 13, these lock seams being generally U-shaped and being swaged or pressed into tight engagement with cooperating flanges formed on the margins of the stampings. The hub portions 8, 8 of the two stampings are joined together by tubular rivets 14, 14, which are shouldered to space the hub disks 8 to the desired dimension, depressions or seats 15, 15 being formed in the hub disk 8 to receive the heads of the hollow shouldered rivets 14, said heads lying below the plane of the outside of the disks 8, 8. The manufacture of the spider is set forth in detail in my copending application Serial No. 280,981 filed May 28, 1928.

After the spider and rim have been separately formed the spider is clamped in a ring clamp comprising two heavy, rigid forgings lying upon opposite sides of the spider and having radial grooves fitting closely the sides of the spokes, the outer periphery of the clamp being substantially flush with the ends of the spokes and supporting the same.

The clamping ring 16 comprises two ring members 22 and 23 having suitably formed radial openings at their meeting edges as indicated at 24 and 25 to receive the individual spokes and clamp the same firmly. A series of bolts or cap screws 26 is employed to clamp the two rings 22 and 23 together upon the spoke ends so as to form with the spider a rigid connection. The diameter of the clamping ring 16 is substantially equal to or slightly less than the diameter of the spider and the face between the openings for the spokes may be recessed and the sides of the rings 22 and 23 chamfered off as indicated in Figure 5 so that substantially on the surfaces surrounding the openings 24—25 remain flush with the ends of the spokes.

The clamp with the spider carried thereby is forced laterally into the rim to tension the rim upon the spider, one of the halves of the clamp being shown at 16 in Fig. 3. The gripping of the ends of the spokes in the clamping ring supports the spokes against lateral crushing when the spider is forced into the rim. Thereafter the web 4 of the rim is spot-welded to the ends of the lock seams including the channel strips 13, 13 by welds indicated at 17, 17, these welds being produced by gripping the end of the spoke in one electrode and applying the welding electrode at the points 18, 18 indicated in Fig. 3. This weld not only joins the end of the spoke to the web of the rim, but also locks together the end of the lock seam so as to give the desired hoop strength to reenforce the end of the spoke against spreading or bursting under load.

The web 4 of the rim is not appreciably altered, and therefore remains substantially smooth so that if a tire should be placed directly upon the same there are no irregularities next to the tire. This is particularly applicable to rims of the drop center type which receive the tire directly as indicated in Fig. 4. The drop center rim 20, which has a drop center 21, is connected to the spider 7 by having the spider forced laterally into the rim and then the lock seams welded as indicated in Fig. 3 to the inner peripheral wall of the web or drop portion 21.

The rim may, of course, be shrunk upon the spider, but I prefer at present to provide a press fit connection between these parts since the time required to make a press fit connection is less than that required for shrinking the rim onto the spider and more accurate results can be obtained in view of the ability to size the rim 1 accurately by the introduction of the clamping ring 16 into the same.

That is to say, if the rim is not strictly circular or is slightly smaller than desired, forcing the clamping ring 16 into the same brings it to the proper size and dimensions for gripping the spider with a suitable degree of tension.

I do not intend to be limited to the details shown and described except as they are recited in the appended claims, nor to the specific order of performing the steps hereinabove recited except as they are specifically required by the following claims.

I claim:

1. The process of making a sheet metal wheel which comprises, uniting two spiders having semicylindrical spokes, pressing the two spiders into an endless circular rim of a slightly smaller diameter than the outside diameter of the spiders to tension the rim onto the spider, and welding the web of the rim to the spiders, thus welding the spiders together at their outer ends.

2. The method of making a sheet metal wheel, which comprises uniting two sheet metal stampings having semicylindrical spokes along the sides of the spokes at the meeting edge of the stampings by lock seams terminates flush with the ends of the spokes, forcing the stampings into a circular rim which is slightly smaller inside diameter than the diameter of the stampings thereby tensioning the rim onto the stampings, and welding the ends of the spokes to the rim at the lock seams.

3. The method of making a sheet metal wheel which comprises forming a closed circular rim of outwardly facing channel section, forming two sheet metal stampings comprising hub and spoke portions, forming a hallow sheet metal spider by uniting said stampings by lock means extending along the sides of the spokes at the meeting edges of the stampings and terminating substantially flush with the ends of the spokes, the rim being of a slightly smaller diameter than the diameter of the spider, forcing the spider into the rim thereby placing the rim under tension and the spider under compression, and welding the web of the rim to the ends of the lock seams on the spokes.

4. The method of making a wheel which comprises forming an endless circular rim, forming two sheet metal stampings comprising hub and spoke portions, uniting said stampings by lock seams along the sides of the spokes at the meeting edges of the stampings and terminating substantially flush with the ends of the spokes, clamping the ends of the spokes in a clamping ring substantially flush with the ends of the spokes, the inside diameter of the rim being slightly less than the outside diameter of the spider and clamping ring, and forcing the clamping ring with the clamped stampings therein into the rim thereby placing the rim under tension and the spider under compression.

In witness whereof I hereunto subscribe my name this 9th day of April, 1929.

GEORGE SPATTA.